United States Patent
Johansson

(10) Patent No.: US 9,709,047 B2
(45) Date of Patent: Jul. 18, 2017

(54) RECIPROCATING PUMP ASSEMBLY FOR LIQUIDS

(75) Inventor: Daniel L. Johansson, Stockholm (SE)

(73) Assignee: Electrolux Home Products Corporation N.V., Brussels (BE)

( * ) Notice: Subject to any disclaimer, the term of this patent is extended or adjusted under 35 U.S.C. 154(b) by 364 days.

(21) Appl. No.: 14/115,439

(22) PCT Filed: Apr. 30, 2012

(86) PCT No.: PCT/EP2012/057903
§ 371 (c)(1),
(2), (4) Date: Jan. 14, 2014

(87) PCT Pub. No.: WO2012/152609
PCT Pub. Date: Nov. 15, 2012

(65) Prior Publication Data
US 2014/0147305 A1 May 29, 2014

(30) Foreign Application Priority Data

May 6, 2011 (SE) ...................................... 1100356

(51) Int. Cl.
*F04B 17/04* (2006.01)
*F04B 35/04* (2006.01)
(Continued)

(52) U.S. Cl.
CPC .............. *F04B 35/04* (2013.01); *A47J 31/402* (2013.01); *F04B 9/02* (2013.01); *F04B 9/14* (2013.01);
(Continued)

(58) Field of Classification Search
CPC .......... F04B 35/04; F04B 35/045; F04B 9/02; F04B 9/14; F04B 17/00; F04B 39/0005;
(Continued)

(56) References Cited

U.S. PATENT DOCUMENTS 4,207,773 A * 6/1980 Stahovic ................ H02K 49/10
310/103
6,501,357 B2 * 12/2002 Petro ......................... H01F 7/13
310/17

(Continued)

FOREIGN PATENT DOCUMENTS

DE 3248229 6/1984
EP 0025562 3/1981
(Continued)

OTHER PUBLICATIONS

International Search Report for PCT/EP2012/057903, dated Aug. 2, 2012, 4 pages.

(Continued)

*Primary Examiner* — Charles Freay
(74) *Attorney, Agent, or Firm* — Pearne & Gordon, LLP

(57) ABSTRACT

A reciprocating pump assembly for dispensing liquids is provided. The pump assembly comprises a pump housing providing an interior compartment and being provided with an inlet for providing a liquid to be dispensed, and an outlet for dispensing the liquid. The assembly further comprises a piston being movably mounted within the interior compartment of the pump housing and comprising ferromagnetic material. The assembly comprises a magnetic actuator for generating a linearly moving magnetic field acting on the piston. The magnetic actuator comprises a permanent magnet arranged to be moved in linear directions, whereby the piston is moved in the pump housing between a resting position and an actuated position under influence of the linearly moving magnetic field.

8 Claims, 4 Drawing Sheets

(51) Int. Cl.
    *A47J 31/40*    (2006.01)
    *F04B 9/02*    (2006.01)
    *F04B 9/14*    (2006.01)
    *F04B 17/00*    (2006.01)
    *H02K 49/10*    (2006.01)
    *H02K 33/00*    (2006.01)

(52) U.S. Cl.
    CPC ........... *F04B 17/00* (2013.01); *H02K 49/102* (2013.01); *H02K 33/00* (2013.01)

(58) Field of Classification Search
    CPC .... F04B 39/122; A47J 31/402; H02K 49/102; H02K 33/00; F16K 31/06; F16K 31/0644; F16K 31/0655
    USPC ......................................................... 417/417
    See application file for complete search history.

(56) References Cited

U.S. PATENT DOCUMENTS

| | | | | |
|---|---|---|---|---|
| 6,527,006 B2* | 3/2003 | Jackson | | F16K 15/033 137/527.6 |
| 6,815,847 B2* | 11/2004 | Duncan | | F04B 35/045 310/12.24 |
| 6,954,040 B2* | 10/2005 | McGill | | F04B 35/045 310/23 |
| 7,215,047 B2* | 5/2007 | Lilie | | H02K 33/16 310/15 |
| 7,550,880 B1* | 6/2009 | Pusl | | F16F 1/185 310/15 |
| 7,557,473 B2* | 7/2009 | Butler | | H02K 33/16 310/20 |
| 7,578,419 B2* | 8/2009 | Greenwald | | B67D 1/0079 222/333 |
| 7,651,015 B2* | 1/2010 | Girard | | A47J 31/402 222/105 |
| 7,868,566 B2* | 1/2011 | Bechtold | | F04B 35/045 318/135 |
| 7,896,202 B2* | 3/2011 | Greenwald | | A47K 5/1207 222/333 |
| 8,033,795 B2* | 10/2011 | Dainez | | F04B 35/045 318/687 |
| 8,091,735 B2* | 1/2012 | Girard | | A47J 31/402 222/105 |
| 8,241,019 B2* | 8/2012 | Kueck | | F04B 7/0076 417/490 |
| 8,998,589 B2* | 4/2015 | Lilie | | F04B 35/045 417/410.1 |
| 2003/0044285 A1* | 3/2003 | Ding | | F04B 9/00 417/53 |
| 2005/0276706 A1* | 12/2005 | Radue | | F04B 17/046 417/417 |
| 2006/0144244 A1* | 7/2006 | Girard | | A47J 31/402 99/295 |
| 2006/0151544 A1* | 7/2006 | Greenwald | | B67D 1/0079 222/333 |
| 2008/0075610 A1* | 3/2008 | Bonniface | | F04B 35/045 417/417 |
| 2009/0129955 A1* | 5/2009 | Schubert | | F04B 35/045 417/417 |
| 2009/0191073 A1* | 7/2009 | Kopecek | | F04B 17/04 417/415 |
| 2009/0266849 A1* | 10/2009 | Greenwald | | A47K 5/1207 222/333 |
| 2011/0008191 A1* | 1/2011 | Lilie | | F04B 35/045 417/410.1 |
| 2011/0318193 A1* | 12/2011 | Hu | | F04B 35/045 417/44.1 |
| 2012/0080960 A1* | 4/2012 | Neff | | H02K 41/031 310/27 |

FOREIGN PATENT DOCUMENTS

EP     1420164     5/2004
WO     0079224     12/2000

OTHER PUBLICATIONS

Office Action from Corresponding Application No. AU2012252651; Dated Jan. 28, 2016.

* cited by examiner

RECIPROCATING PUMP ASSEMBLY FOR LIQUIDS

TECHNICAL FIELD

The present invention relates to reciprocating pumps for dispensing a liquid. More particularly, the invention relates to a reciprocating pump assembly comprising a pump housing providing an interior compartment. The pump housing is provided with an inlet for providing a liquid to be dispensed and an outlet for dispensing the liquid. The assembly further comprises a piston movably mounted within the interior compartment of the pump housing. The piston comprises ferromagnetic material. The assembly further comprises a magnetic actuator for generating a linearly moving magnetic field acting on the piston.

BACKGROUND

In beverage dispensers using pouches or the like for providing liquid concentrate, the dispensing of the concentrate liquid is done by a pump. Typically, the pump is part of the dispenser and a concentrate liquid bag or pouch is connected to the pump on one side and the mixing water on the other side. In order to ensure a high quality beverage dispenser it is essential to clean and sanitize especially the concentrate liquid dispensing system periodically to avoid the growth of bacteria which might be harmful to the customers and degrade the quality of the dispensed beverage. Therefore, the pumps are often designed to be disposable or recyclable.

US2006/0151544 discloses a disposable concentrate pump where a small pump body is part of a liquid collapsible bag reservoir, and an actuating solenoid is mounted in the dispenser. When a new bag is loaded, the attached pump body is inserted into a solenoid. When the bag is empty parts of the pump will be disposed, along with the empty bag. The pump is connected to streaming water and is arranged in an electrical appliance.

GB 2103296 discloses a pump having a pumping chamber defined by a flexible or resilient cylindrical chamber wall, and non-return inlet and outlet valves. Pumping is effected by aerial deformation of the pumping chamber achieved by electro-magnetic actuating means. The liquid to be dispensed is stored in a collapsible container.

EP1018601 discloses a reciprocating pump. A piston assembly has a dispensing end and an opposed end and is moveably mounted for reciprocating movement in opposed linear directions. A linear magnetic drive generates a linearly moving magnetic field for moving the piston assembly in opposed linear directions through a swept volume in each of the opposed linear directions. An energy storage and release media communicates with a reservoir chamber for storing energy as a result of movement of the piston assembly in a direction away from the dispensing end of the interior compartment and for releasing the stored energy as the piston assembly is moved in a direction toward the dispensing end of the interior compartment. The pumped flow rate is high and a powerful drive is therefore needed.

All pump devices mentioned above are detachable from their actuating mechanisms and are therefore easily replaceable. The known reciprocating pumping mechanisms are all driven by an electromagnetic actuating mechanism. Such type of driving requires a power source such as a battery or connection to the power net to enable the magnet to generate a proper magnetic field. Electromagnetic driving mechanisms of this type are complex and expensive, and occupy a lot of space. Further, for small, hot water mains connected and/or non-powered appliances such as water pitchers or table top water carbonators, a driving mechanism without the need for a separate power source is preferred.

Thus, there is a need for a pump with an improved actuating mechanism.

SUMMARY

An object of the present invention is to provide a reciprocating pump overcoming at least some of the drawbacks mentioned above.

According to a first aspect of the invention, this object is achieved by a reciprocating pump assembly for dispensing liquids, the pump assembly comprising: a pump housing providing an interior compartment, the pump housing being provided with an inlet through which a liquid to be dispensed is provided, and an outlet for dispensing the liquid. The assembly further comprises a piston being arranged to perform a linear movement within the interior compartment of the pump housing. The piston comprises ferromagnetic material. The assembly further comprises a magnetic actuator for generating a linearly moving magnetic field acting on the piston. The magnetic actuator comprises a permanent magnet arranged to be moved linearly substantially parallel to the linear movement of the piston, whereby the linearly moving magnetic field is generated, and the piston is moved in the pump housing between a resting position and an actuated position under influence of the generated linearly moving magnetic field.

The present invention provides a reciprocating pump assembly with a robust and simple actuating mechanism with low risk for parts malfunctioning. Further, a compact and robust assembly that will fit into small and cheap applications is provided. Due to the use of a permanent magnet, there is no need for any external power supply. The robust and simple construction limits the risk for malfunctioning. Due to the use of magnetic forces in the actuator, there are no mechanical connections between the actuator and the piston, and any individual part of the assembly may therefore be replaced easily. As a result, the above mentioned object is achieved.

In another embodiment, the reciprocating pump assembly further comprises a first biasing member arranged to apply a force on the permanent magnet whereby the permanent magnet is retracted from the actuated position to the resting position. By combining a permanent magnet with a spring, a firmer, quicker and more accurate movement of the generated magnetic field, and thereby of the piston, is obtained. Further, the reciprocating pump assembly may comprise a second biasing member arranged to apply a force on the piston whereby the piston is retracted from the actuated position to the resting position. The second biasing member provides a faster return of the piston, thereby still further improving the movements of the piston.

In yet another embodiment, the permanent magnet and the second biasing member are arranged to interact whereby the permanent magnet is moved in opposed linear directions in relation to the movements of the piston. The forces from respective biasing member will then be used to fully contribute to achieve quick and fast movements of the piston.

In another embodiment, the force applied by the second biasing member on the piston is overcoming the magnetic force acting on the piston, when the piston is positioned in the resting position. Thereby, the piston will be safely positioned in the resting position when the pump is not in use. Further, the risk of unwanted leakage is limited.

In yet another embodiment, the magnetic force acting on the piston overcomes the force applied by the second biasing member on the piston, when the permanent magnet starts to move from the resting position in a linear direction towards the piston. The movement of the piston will therefore start shortly after movements of the permanent magnet resulting in a quick and fast movement of the piston.

In yet another embodiment, the assembly comprises a check-valve, whereby liquid is enabled to flow into the interior compartment, and whereby liquid is blocked from flowing back. The liquid provided will thus be fresh and uncontaminated.

In a preferred embodiment, the outlet of the pump housing is provided with a nozzle.

In a preferred embodiment, the movements of the permanent magnet are achieved by the movements of a hand by the user.

To achieve a magnetic field strong enough to move the piston in a satisfying manner, a permanent magnet made from Neodymium (NdFeB) or equivalent may be chosen.

In another aspect of the invention, a household appliance comprising such a reciprocating pump assembly is provided. Since there is no need for such pump assembly to be connected to a power net, such a solution will provide easy assembling and construction of the appliance, as well as reliable functionality. Further, small appliances like water pitchers or table top carbonators may be used without any external power source or net.

Further features of, and advantages with, the present invention will become apparent when studying the appended claims and the following detailed description. Those skilled in the art will realize that different features of the present invention may be combined to create embodiments other than those described in the following, without departing from the scope of the present invention, as defined by the appended claims.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully with reference to the accompanying drawings, in which example embodiments are shown. However, this invention should not be construed as limited to the embodiments set forth herein. Disclosed features of example embodiments may be combined as readily understood by one of ordinary skill in the art to which this invention belongs. Like numbers refer to like elements throughout.

Figure 1:
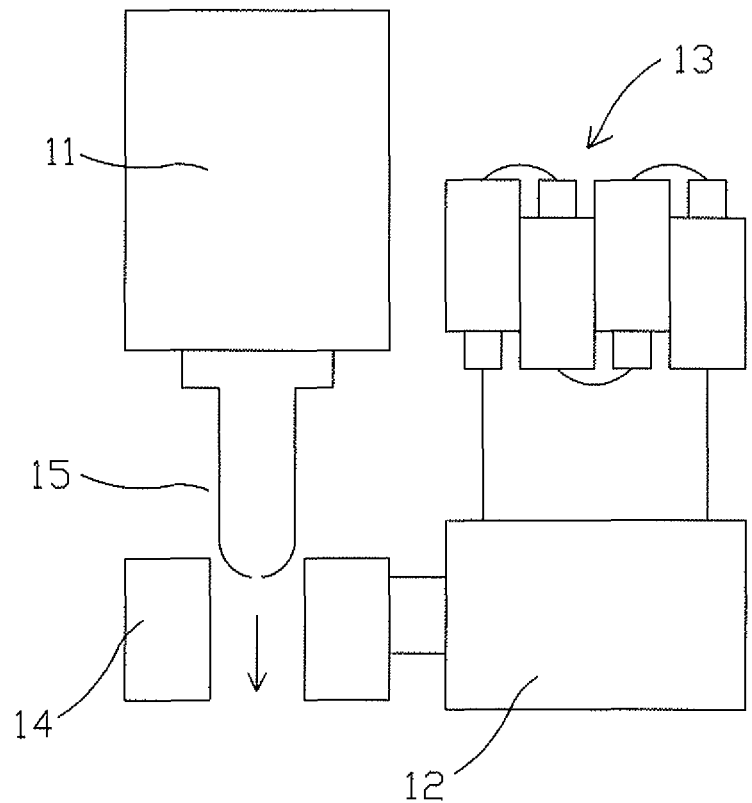
FIG. 1 illustrates a reciprocating pump in accordance with prior art.

FIG. 1 shows a pump system in accordance with prior art. A pump 15 is connected to a pouch 11 or the like comprising a liquid to be dispensed. To perform a positive displacement of a liquid from a pouch 11 to the outside, the pump 15 performs a reciprocating movement. An electro magnet 14 is arranged to generate a moving magnetic field acting on the pump 15, whereby the magnetic force from the field causes the pump 15 to move in the same manner. By the reciprocating movement performed by the pump 15, a positive displacement of liquid from the pouch 11 to the outside is obtained. The electro magnet 14 is controlled by a Printed Circuit Board (PCB) 12 connected to an external power source 13, like a battery package or a power net. Electronic circuits on the PCB 12 controls the voltage applied on the electro magnet 14 in such a way that a moving magnetic field is generated.

Figure 2:
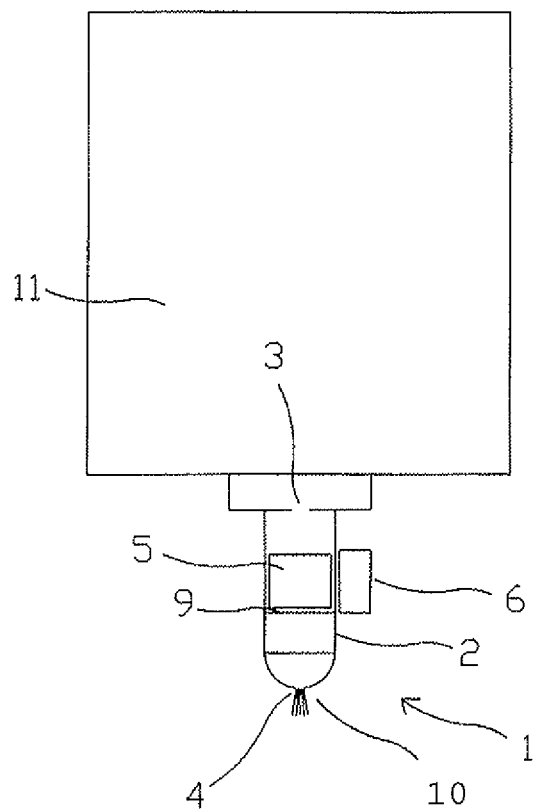
FIG. 2 illustrates a reciprocating pump in accordance with the present invention.

FIG. 2 illustrates an embodiment of a reciprocating pump assembly 1 in accordance with the present invention. The pump assembly 1 may be connected to a pouch 11 comprising a consumable liquid to be dispensed. The pump assembly 1 comprises a piston 5 made of ferromagnetic material arranged inside a pump housing 2. The pump housing 2 provides an interior compartment, the pump housing being provided with an inlet 3 through which a liquid to be dispensed is provided, and an outlet 4 for dispensing the liquid. To perform a positive displacement of a liquid from a pouch 11 to the outside, the piston 5 performs a reciprocating movement. A permanent magnet 6 is arranged on the outside of the pump housing 2. The permanent magnet 6 is moved in a reciprocating manner whereby the magnetic force from the magnet 6 causes the piston 5 to move in a reciprocating manner. By the reciprocating movement performed by the piston 5, a positive displacement of liquid from the pouch 11 to the outside is obtained.

Figure 3:
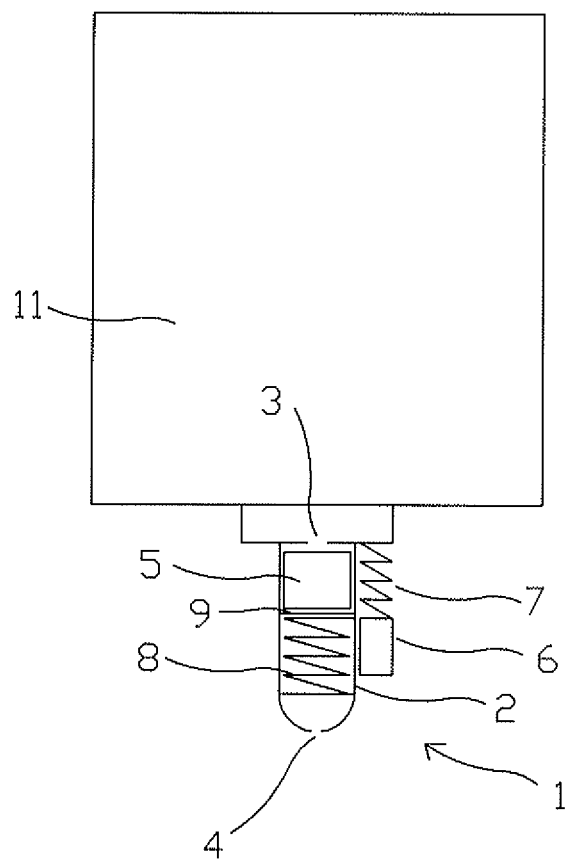
FIG. 3 illustrates a reciprocating pump in accordance with the present invention shown in a resting position.

FIG. 3 illustrates a further embodiment of a reciprocating pump assembly 1 in accordance with the present invention. The pump assembly 1 may further comprise first and second biasing means 7, 8, in the figure shown as springs, but may be any type of biasing member. The springs are acting on the piston 5 and on the permanent magnet 6, respectively. The permanent magnet 6 is moved in a counter direction in relation to the piston 5 whereby the forces of the biasing members 7, 8 are utilized to achieve a faster reciprocating movement, obtaining a higher velocity of the out flowing liquid and a higher pressure at the nozzle 10. By combining a permanent magnet 6 with a first biasing member 7, a firmer and quicker movement with higher accuracy of the permanent magnet and thereby of the magnetic field acting on the piston 5 is obtained. Providing also the piston with a second biasing member 8 will further improve the movements of the piston 5.

The second biasing member 8 may advantageously be dimensioned to achieve that the magnetic force acting on the piston 5 overcomes the force applied by the second biasing member 8 on the piston when the permanent magnet 6 starts to move from the resting position in a linear direction towards the piston. The movement of the piston 5 will therefore start shortly after movements of the permanent magnet resulting in a quick and fast movement of the piston. The biasing member 7 may be dimensioned to apply a force strong enough to ensure that the magnet 6 is kept from moving towards the piston 5 when the assembly is in the resting position as shown in FIG. 3.

A check valve 9 may be comprised, allowing the liquid to flow only in one direction, from the pouch 11 to a pump nozzle 10 through which the liquid is dispensed.

When in use, the pump assembly 1 works as follows. When the pump is in a resting 10 position as shown in FIG. 3, the force from the spring 8 acting on the piston 5 is stronger than the force generated by the magnetic field of the permanent magnet 6 acting on the piston 5. Thereby, the piston 8 is kept in the resting position.

Figure 4:
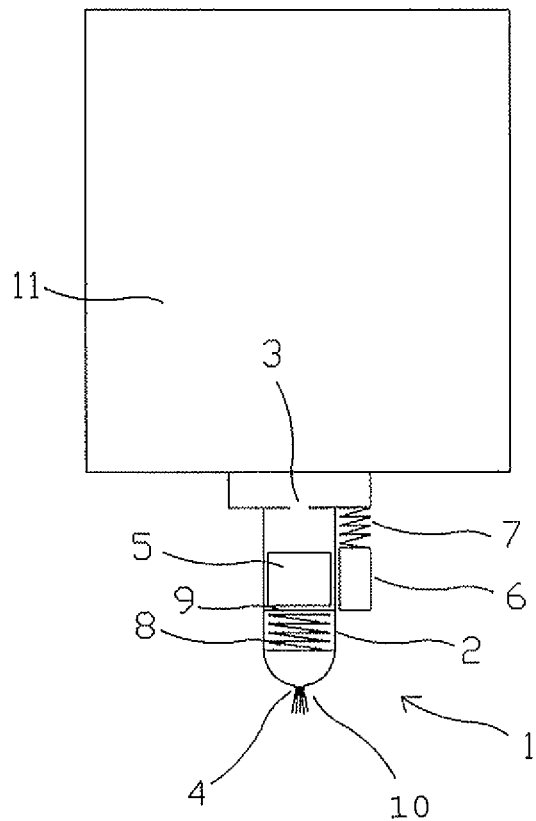
FIG. 4 illustrates a reciprocating pump in accordance with the present invention shown in an actuated position.

A user pushes the permanent magnet 6 from its resting position towards the force of the spring 7 whereby the spring is contracted. When the permanent magnet 6 is moved close enough to attract the piston 5 and to overcome the force of the spring 8, the piston 5 is moved from its resting position towards the permanent magnet 6 and the spring 8 is thereby contracted. Thereafter, the user lets go of the permanent magnet 6 and the magnet is retracted to the resting position by the force of the spring 7. When the permanent magnet 6 is moved away from the piston 5, the force from the spring 8 overcomes the force of the magnet 6 and the piston 5 is moved back to its resting position by the force of the spring 8. The piston 5 and the permanent magnet 6 are shown in their actuated positions, with respective spring contracted, in FIG. 4.

To achieve a magnetic field strong enough to move the piston 5 in a satisfying manner, a permanent magnet made from Neodymium (NdFeB) or equivalent may be chosen.

Example embodiments described above may be combined as understood by a person skilled in the art. Although the invention has been described with reference to example embodiments, many different alterations, modifications and the like will become apparent for those skilled in the art.

Therefore, it is to be understood that the foregoing is illustrative of various example embodiments and the invention is not to be limited to the specific embodiments disclosed and that modifications to the disclosed embodiments, combinations of features of disclosed embodiments as well as other embodiments are intended to be included within the scope of the appended claims.

The terminology used herein is for the purpose of describing particular embodiments only and is not intended to be limiting of the invention.

Unless otherwise defined, all terms, including technical and scientific terms, used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Example embodiments of the present invention have been described herein with reference to cross-section illustrations that are schematic illustrations of idealized embodiments, and intermediate structures, of the invention. As such, variations from the shapes of the illustrations as a result, for example, of manufacturing techniques and/or tolerances are to be expected. Thus, embodiments of the present invention should not be construed as limited to the particular shapes of regions illustrated herein but are to include deviations in shape that result, for example, from manufacturing.

The invention claimed is:

1. A manually-operated reciprocating pump assembly for dispensing liquids,
the pump assembly comprising:
a pump housing providing an interior compartment, the pump housing being provided with an inlet through which a liquid to be dispensed is provided, and an outlet for dispensing the liquid,
a piston being arranged to perform a linear movement within the interior compartment of the pump housing, the piston comprising ferromagnetic material,
a magnetic actuator comprising a magnetic field acting on the piston,
wherein the magnetic actuator comprises a permanent magnet arranged exterior of the pump housing to be moved linearly substantially parallel to the linear movement of the piston between an actuator resting position and an actuator actuated position, whereby a linearly moving magnetic field of the magnetic actuator thereby causes the piston to be moved within the pump housing between a piston resting position and a piston actuated position under influence of the linearly moving magnetic field,
wherein movement of the permanent magnet is performed manually by a user without the use of electricity;
the assembly further comprising:
a first biasing member arranged exterior of the pump housing to apply a force on the permanent magnet in a first direction to bias the permanent magnet to the actuator resting position; and
a second biasing member arranged within the interior compartment to apply a force on the piston in a second direction, opposite to the first direction, to bias the piston to the piston resting position,
wherein the permanent magnet and the second biasing member are arranged to interact whereby the permanent magnet is moved in opposed linear directions in relation to the movements of the piston,
wherein when the permanent magnet is moved in the second direction towards the piston, the force of the permanent magnet attracts the piston and overcomes the force of the second biasing member so that the piston is moved from the piston resting position towards the piston actuated position and the second biasing member is thereby contracted, and
wherein when the permanent magnet is moved in the first direction away from the piston, the force from the second biasing member overcomes the force of the permanent magnet so that the piston is moved back to the piston resting position by the force of the second biasing member.

2. A reciprocating pump assembly according to claim 1, wherein the force applied by the second biasing member on the piston overcomes the magnetic force acting on the piston, when the piston is positioned in the piston resting position.

3. A reciprocating pump assembly according to claim 1, wherein the magnetic force acting on the piston overcomes the force applied by the second biasing member on the piston, when the permanent magnet starts to move from the piston resting position in a linear direction towards the piston.

4. A reciprocating pump assembly according to claim 1, wherein the assembly further comprises a check-valve, whereby liquid is enabled to flow into the interior compartment, and whereby liquid is blocked from flowing back.

5. A reciprocating pump assembly according to claim 1, wherein the outlet of the pump housing is provided with a nozzle.

6. A reciprocating pump assembly according to claim 1, wherein the movements of the permanent magnet are achieved by movements by hand of a user.

7. A reciprocating pump assembly according to claim 1, wherein the permanent magnet is made of Neodymium (NdFeB).

8. A household appliance comprising a reciprocating pump assembly according to claim 1.

* * * * *